United States Patent
Osberger

[11] 4,046,335
[45] Sept. 6, 1977

[54] HELICOPTERS SAFETY DRIVE

[76] Inventor: Helmut Osberger, A 3491 Strass bei Krems, Niederosterreich, Austria

[21] Appl. No.: 590,531

[22] Filed: June 26, 1975

[51] Int. Cl.² .......................................... B64C 27/18
[52] U.S. Cl. .............................. 244/17.19; 244/58; 416/171
[58] Field of Search .......... 244/17.17, 17.15, 17.19, 244/17.11, 58, 60; 416/171

[56] References Cited
U.S. PATENT DOCUMENTS

| | | | |
|---|---|---|---|
| 1,264,712 | 4/1918 | Tweed | 244/17.19 |
| 1,886,327 | 11/1932 | Carlson | 244/58 |
| 2,319,169 | 5/1943 | Tampier | 244/60 |
| 2,899,149 | 8/1959 | Breguiet | 416/171 X |
| 3,325,122 | 6/1967 | Young | 244/58 X |

FOREIGN PATENT DOCUMENTS 1,245,769  10/1960  France ................ 244/17.11

Primary Examiner—Trygve M. Blix
Assistant Examiner—Barry L. Kelmachter
Attorney, Agent, or Firm—Allison C. Collard

[57] ABSTRACT

A helicopter is provided with an emergency drive system adapted to rotate the helicopter rotor in the event of motor failure, the drive system being powered by compressed gas stored in the helicopter. The system may comprise nozzles aimed at the plane of rotation of the rotor, or a turbine coupled to the rotor drive shaft.

2 Claims, 4 Drawing Figures

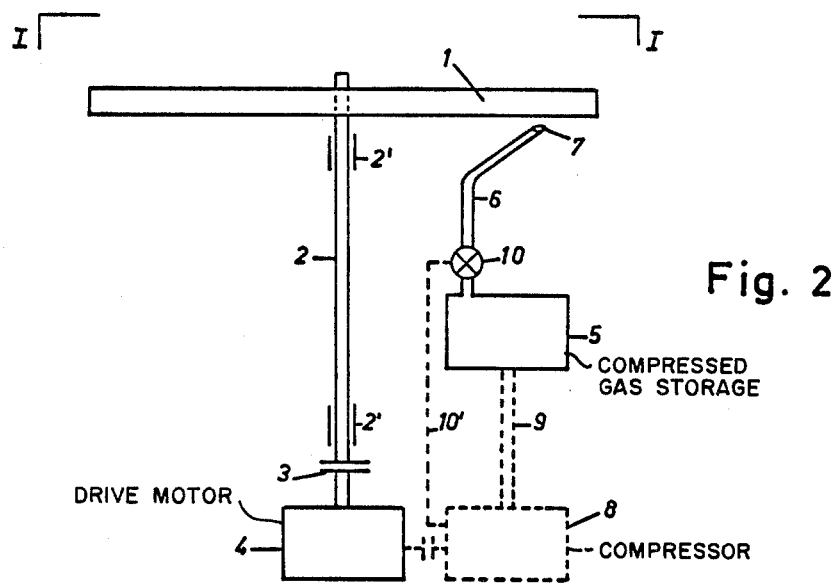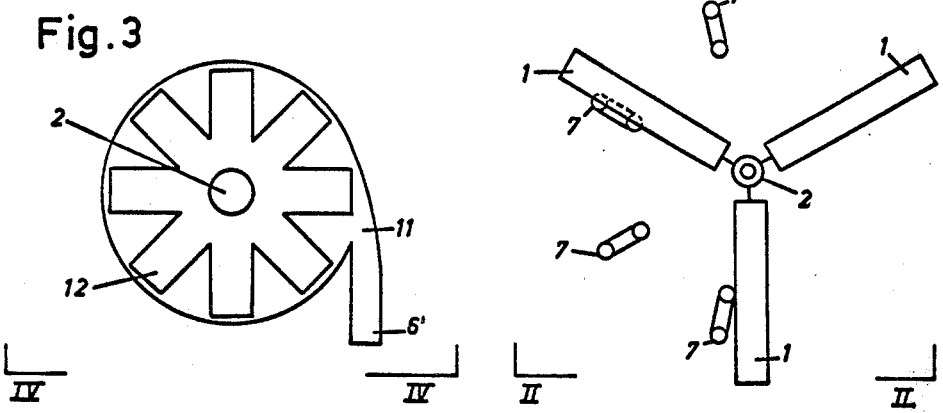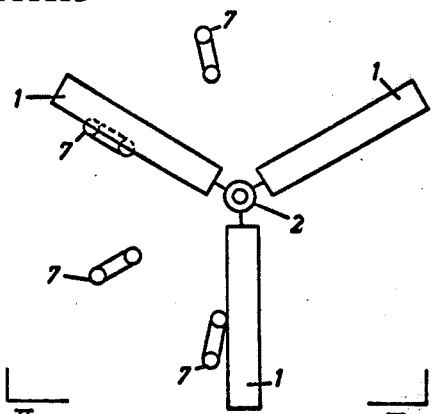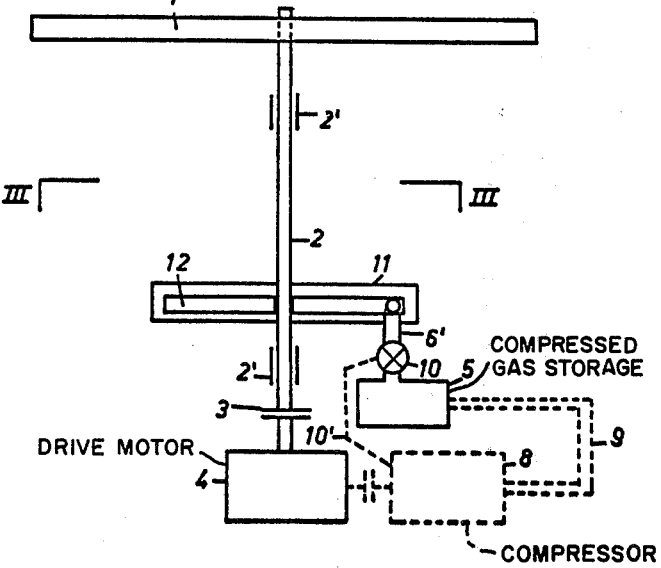

HELICOPTERS SAFETY DRIVE

The invention relates to a helicopter or like aircraft with at least one rotor which can be set into rotation by motor means.

Aircraft of this kind, such as helicopters or the like, are known to suffer from the dangerous disadvantage that in the event of the rotor stopping during flight, for example due to lack of fuel or as a result of mechanical damage, the aircraft will immediately drop vertically to the ground because such aircraft is unable to glide. Irrespective of the reason, in some cases insignificant, which give rise to such undesired stoppage of the rotor, actual accidents will always occur with a substantial loss of human life and material; the possibility of an emergency landing as with an aircraft with wings is not possible in the case of helicopters because freefall follows immediately upon the stoppage of the rotors.

It is the object of the present invention to avoid this disadvantage of helicopters or like aircraft and to enable such aircraft to fly for a specific period of time after the motor-driven rotor has failed, such time being sufficient to allow the apparatus to land on the ground without destroying the apparatus or endangering the passengers.

In its essential feature this object of the invention is achieved in that the helicopter, with at least one rotor which can be set into rotation by motor means, is also provided with an emergency drive for rotating the said rotor, such drive being feedable and startable when required by means of a compressed gas, for example compressed air, stored in gaseous, liquid or solid form.

A specific supply of stored, compressed gas, for example compressed air, which is carried by the aircraft or is generated or replenished during flight, is sufficient to maintain rotation or re-start rotation of the aircraft rotor after this has been disengaged from the motor drive until the pilot achieves a ground landing of the helicopter, which in any case usually flies only at a relatively low altitude.

There are different means for driving the rotor with stored compressed gas, for example compressed air, within the scope of the invention.

Preferably, the emergency drive comprises nozzles or like exit means for compressed air or compressed gas which are connected through supply ducts to a compressed air or compressed gas store and are orientated against the rotor blades or are adjustable so that compressed gas or compressed air discharged from the nozzles is able to set the rotor into rotation. The nozzles must of course be arranged close to the rotor in such a way that they not only provide the optimum driving power but so that their reaction forces do not endanger the stability of the aircraft but instead contribute to improving it.

Advantageously, the supporting structure or fuselage structure of the helicopter or the like can be constructed as a pipe system for such supply ducts or can itself be constructed as a reservoir for compressed gas or compressed air, thus saving material for the equipment of the emergency drive and substantially reducing its weight.

The supply of compressed gas or compressed air required for the emergency drive or the magnitude of the pressure of the stored amount of gas must of course have a specific minimum value but it must not exceed a maximum which is defined by the construction of the storage vessel.

The supply of compressed gas and the pressure of this supply must therefore be kept constant to a specific optimum extent. If the amount of compressed gas required is not already carried by the aircraft as an emergency supply it is advisable to connect the compressed gas reservoir in the manner of a wind chamber through supply delivery ducts to a pump which can be coupled to the motor drive of the rotor, and for the reservoir to be charged to a pre-defined pressure which is constantly maintained and is sufficient for the emergency drive of the rotor within a suitable period of time which is adequate for emergency landing. To this end, the pressure level can be advantageously limited by an automatically operating regulating valve which controls the pump output or a relief valve.

In order to save time in the event of failure of the motor drive for the rotor and to achieve independence of the reaction capacity of the pilot in such an emergency case, it is possible within the scope of the invention to provide a pulse transmitter for starting the emergency drive and is adapted to automatically and immediately deliver a pulse for starting the emergency drive in dependency on any undesired stoppage of the motor drive for the rotor, and if necessary also provides a pulse for uncoupling the motor drive from the rotor.

There are of course other possibilities within the scope of the general idea of the invention in order to utilize an existing supply of compressed gas or compressed air for driving the rotor in an emergency case.

It is not essential for the emergency drive to be obtained by blowing upon the rotor blades themselves through nozzles or the like but it is also possible to provide an auxiliary rotor, a compressed gas or compressed air turbine or like impeller capable of converting gas flow into rotating motion, such device being then set into rotation when required (in an emergency case) by means of the stored pressurized quantity of gas, and where such device can be coupled to the shaft of the motor-driven rotor, through a transmission or simply by coaxial means.

Within the scope of the invention it is possible for such a compressed gas or compressed air turbine to be constantly coupled to the rotor shaft either coaxially or through a transmission, so that it co-rotates idly in normal operation and is supplied automatically or by manual control with compressed air or compressed gas if there is any risk of failure of the motor drive.

Helicopters are usually provided with two rotors for stabilization purposes, either two rotors of the same size or a larger principal rotor and a smaller stern rotor.

Within the scope of the invention at least one rotor is provided with an emergency drive but if this is insufficient to land the helicopter safely in an emergency case it is also possible for both rotors to be provided with a common emergency drive or two separate emergency drives. This also applies to helicopters with more than two rotors.

Any gas, whose other properties render it suitable for the purpose according to the invention and which can be stored in gaseous, liquid or solid form, can be used in addition to air as a compressed gas within the scope of the invention.

The invention will now be more particularly described by way of example with reference to the accompanying drawings, in which:

FIGS. 1 and 2 show an example wherein compressed air serving the purpose of emergency drive of the helicopter rotor is aimed direct at the plane of the rotor blades; in this connection, FIG. 1 is a plan view taken along the line I—I of FIG. 2, and FIG. 2 is a lateral elevation taken along the line II—II of FIG. 1.

FIGS. 3 and 4 illustrate an example, wherein the emergency drive comprises a bladed wheel, a turbine or the like, which may be acted upon by compressed air and is coupled to the rotor shaft; in this case, FIG. 3 is a plan view taken along the line III—III of FIG. 4, and FIG. 4 is a lateral elevation taken along the line IV—IV of FIG. 3.

In the example shown in FIGS. 1 and 2, drive for a rotor with the rotor blades 1 is derived via a principal shaft 2 journalled in bearings 2' and via a clutch 3 from a driving motor 4. The emergency drive in this example comprises a compressed air store 5 and one or more compressed air pipes 6 leading to outlet nozzles 7 which open near to the plane of the rotor blades 1 and are directed in such manner that an emergent flow of compressed air in each case fully impinges on at least one rotor blade 1 and sets the same in rotation. To this end, several such outlet nozzles 7 are advantageously incorporated, with an angular spaceing from each other which is smaller than the angular spacing of the rotor blades 1, e.g. three nozzles per third of the rotor circle, so that at least one of the rotor blades 1 has a comparatively small spacing from such an outlet nozzle 7 and is blown on by the outflowing compressed air with adequate kinetic energy. In any event, the air feed to these nozzles 7 may desirably be positively controlled in such manner that it is always only the outlet nozzle 7 situated closest to a rotor blade 1 which is supplied with air, in order thereby the save on compressed air. As already stated, it is sufficient to incorporate such nozzles 7 within a partial area only of the rotor circle, and to allow incidence of air on one of the rotor blades only, but such nozzles may also be arranged in uniform spread throughout the circumference of the rotor circle.

The compressed air tank 5 may contain a store of highly compressed air under pressure, which is not replenishable, but it may also be constructed as a pressure chamber wherein the internal pressure is constantly kept at a maximum predetermined level by a compressor 8, so that compressed air is then available in case of emergency for entrainment of the rotor. This possible case has been illustrated in dashed lines in FIG. 2, the feed pipe from the compressor 8 to the compressed air tank 5 being marked 9. An outlet valve 10 of the compressed air tank 5 may be combined with a conventional pressure-operated switch 10' operatively coupled to compressor 8, in order to switch off the compressor 8 as soon as sufficient pressure is present within the tank 5, and to switch on the compressor via the switch 10' as soon as this pressure drops below a predetermined value.

In the example shown in FIGS. 3 and 4, equivalent parts to the example described above are marked by the same reference numerals. In this case, the principal shaft 2 of the rotor is coupled to a bladed wheel 12 journalled within a case 11, which may be acted upon by the compressed air coming from the compressed air tank 5 via a feed pipe 6', in case of emergency, in order to place the principal shaft 2 together with the rotor in rotation.

In both versions of embodiment, the clutch 3 of the principal shaft may be declutchable, preferably automatic, from the motor 4 if the driving motor 4 breaks down suddenly, e.g. as a result of motor or transmission damage, fuel starvation, or the like. This declutching of the clutch 3 should be combined, is possible in synchronous manner, with the activation of the emergency drive, in which connection it is sufficient to open the outlet valve 10 of the compressed air tank 5 in order to place this emergency drive in operation. In this way, the starting up of the emergency drive is possible directly and most rapidly quite independently of the speed of reaction, physical condition and degree of flying expertise of the pilot, so that practically no discernible interruption occurs in the rotation of the rotor. This activation of the emergency drive may moreover be automatised in such degree that a contributory action by the pilot is totally unnecessary in case of a breakdown of the motor 4.

The reserve of compressed air available should be adequate to be able to keep the rotor running until either a windmilling action of the rotor sets in or until the pilot is able to induce a windmilling action of this kind by some navigational operation and to make an emergency landing.

The inventive emergency drive is thus primarily envisaged for overbridging that relatively short period of time lying between the failure of the driving motor and the onset of the windmilling action of the rotor. A period of time of this kind may well be short, but is very dangerous, and falls within the so-called danger zone for the helicopter in flight. For a given conventional helicopter, a definite period is required to bring the helicopter from the driven condition to the "windmilling" condition in case of power plant failure. Consequently, there are altitude and speed ranges in which a safe "glide" landing is impossible with a conventional helicopter since the helicopter strikes the ground too rapidly, and this danger zone should normally be avoided by the pilot on the score of safety. By means of the invention it is possible to keep the aircraft in the air beyond this period without endangering the pilot and without special demands on his speed of reaction and flying expertise, until the aircraft may be landed by means of the windmilling action.

I claim:
1. A helicopter comprising:
   at least one rotor;
   clutch means operatively declutchably coupled to said rotor for operatively disengaging with said rotor in an emergency;
   main motor means for directly driving said rotor via said clutch means;
   a storage of compressed gas adapted to contain a supply of compressed gas;
   at least one emergency drive means for directly rotating said rotor and for starting and being operated in event of emergency by means of said compressed gas from said storage of compressed gas;
   said emergency drive means comprising nozzles and supply ducts connected to said storage of compressed gas, said nozzles being directed from below the rotor angularly upwardly and radially outwardly toward the rotor so that said compressed gas is discharged from said nozzles to set the rotor into rotation when said emergency drive means is operated; and
   said clutch means for disengaging said main motor means from said rotor in said emergency.
2. The helicopter according to claim 1, further comprising:
   means for constantly keeping said storage of compressed gas at a constant pressure and operatively connected to said main motor means for being operated thereby to maintain gas pressure constantly at a minimum value.

* * * * *